(12) United States Patent
Little

(10) Patent No.: US 9,081,970 B2
(45) Date of Patent: Jul. 14, 2015

(54) DATA SECURITY DEVICE

(71) Applicant: PANGAEA MEDIA LTD, Farnborough, Hampshire (GB)

(72) Inventor: James Little, Farnborough (GB)

(73) Assignee: Pangaea Media Ltd. (GB)

( * ) Notice: Subject to any disclaimer, the term of this patent is extended or adjusted under 35 U.S.C. 154(b) by 0 days.

(21) Appl. No.: 14/363,350

(22) PCT Filed: Nov. 22, 2012

(86) PCT No.: PCT/GB2012/000853
§ 371 (c)(1),
(2) Date: Jun. 6, 2014

(87) PCT Pub. No.: WO2013/083941
PCT Pub. Date: Jun. 13, 2013

(65) Prior Publication Data
US 2014/0373166 A1 Dec. 18, 2014

(30) Foreign Application Priority Data
Dec. 8, 2011 (GB) .................................. 1121120.8

(51) Int. Cl.
*G06F 21/60* (2013.01)
*G06F 21/79* (2013.01)
*G06F 21/86* (2013.01)

(52) U.S. Cl.
CPC ................ *G06F 21/60* (2013.01); *G06F 21/79* (2013.01); *G06F 21/86* (2013.01); *G06F 2221/2143* (2013.01)

(58) Field of Classification Search
CPC ......... G06F 21/31; G06F 21/34; G06F 21/75; G06F 21/78; G06F 21/86; G06F 21/88; G06F 21/305; G06F 21/445; F42B 3/22; F42B 3/121; F42B 3/122
See application file for complete search history.

(56) References Cited

U.S. PATENT DOCUMENTS

2002/0162011 A1 10/2002 Tanaka et al.
2003/0192997 A1 10/2003 Desai et al.
2006/0225142 A1 10/2006 Moon
(Continued)

FOREIGN PATENT DOCUMENTS

CN 101706853 5/2010
EP 1521160 4/2005
(Continued)

OTHER PUBLICATIONS

International Search Report, Form PCT/ISA/210, for International Application No. PCT/GB2012/000853, mailed Apr. 5, 2013 by ISA/EP, 4 sheets.
(Continued)

*Primary Examiner* — Kambiz Zand
*Assistant Examiner* — Noura Zoubair
(74) *Attorney, Agent, or Firm* — Ware, Fressola, Maguire & Barber LLP

(57) ABSTRACT

The invention provides an apparatus for storing data using solid state technology. The apparatus is configured to employ a destruction mechanism that damages elements of the apparatus to render data stored within it irrecoverable in the event that predetermined conditions are met. There are various trigger mechanisms that initiate the destruction process, providing security for stored data from unauthorized access.

16 Claims, 1 Drawing Sheet

(56) References Cited

U.S. PATENT DOCUMENTS

Figure 1:
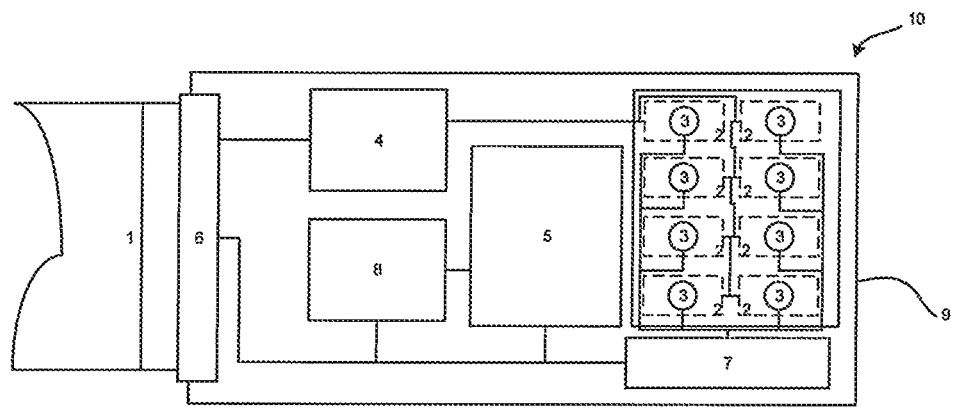

| | | |
|---|---|---|
| 2008/0091605 A1 | 4/2008 | Hughes et al. |
| 2008/0276819 A1* | 11/2008 | Desai et al. ............... 102/202.7 |
| 2010/0064371 A1 | 3/2010 | Mostovych |
| 2010/0132047 A1 | 5/2010 | Rodriguez et al. |
| 2011/0004938 A1 | 1/2011 | Dalzell et al. |
| 2011/0055891 A1 | 3/2011 | Rice |

FOREIGN PATENT DOCUMENTS

| | | |
|---|---|---|
| GB | 2456396 | 7/2009 |
| GB | 2460143 | 11/2009 |
| GB | 2481043 A | 12/2011 |
| IL | WO02095550 A2 * | 11/2002 |
| WO | 02/095550 A2 | 11/2002 |
| WO | 2006105552 | 10/2006 |

OTHER PUBLICATIONS

GB1009665.9 Search Report dated Sep. 27, 2010, 1 page.
GB1121103.4 Search Report dated Oct. 5, 2012, 1 page.
GB1121120.8 Search Report dated Oct. 4, 2012, 1 page.
International Search Report, Form PCT/ISA/210, for International Application No. PCT/GB2012/000852, mailed Apr. 3, 2013 by ISA/EP, 3 pages.
Bibliographic data and Abstract for CN101706853, 1 page.

* cited by examiner

DATA SECURITY DEVICE

This invention relates to an apparatus for storing data and means for preserving the confidentiality of data stored on such an apparatus.

As the storage and transmission of large quantities of data has become easier, data security has become of greater concern for those dealing with confidential information. In particular, the increasing use of portable computing components such as laptops, external hard drives, memory cards and memory sticks means that the possibility of such items falling into the wrong hands through simple loss or human error as well as actual theft is ever more likely.

Passwords and other identification systems such as biometric devices can help to protect data, but ultimately these are vulnerable to attack if a determined individual has long enough. If necessary passwords can be guessed by simply entering combinations until the correct one is found.

In light of this a device or apparatus which can protect the integrity of information stored on it, by making it more difficult to access the data without proper authorisation and ultimately destroying the data in the event of loss, theft, or unauthorised access, would be advantageous.

It is known that physical destruction of magnetic data storage is the only sure way of safeguarding against unauthorised access to data. Merely deleting the information on a drive such as a conventional magnetic disc hard drive or an SSD (Solid State Drive) does not guarantee that the information cannot be retrieved. By taking advantage of traces left in the recording medium, for example due to the hysteresis effect in the case of magnetic mediums, information that is 'deleted' can be recovered. Destroying the device, or at least causing significant physical harm to it, will prevent this.

Some prior art solutions have been presented to address this issue, but these may not necessarily be efficacious. For example, International Patent Number WO 02/095550 to Gray discloses and relates to a security device adapted to be connected to a digital data storage device and to physically destroy said data in case of unauthorised using of the same. The patent WO 02/095550 in one embodiment describes the use of an explosive ring situated on top of a hard disk drive platter which would destroy the data if ignited. The invention disclosed in this patent fails to define in particular the detonation method and contact method the device has to the explosive ring from the battery. Given this ring is spinning with the disk platter at 5,200 revolutions per minute the invention mentions nothing about sustaining a connection to the explosive ring while it spins, which would be necessary to initiate the explosive. Given this design, the production of said device would be impractical from the perspective of applying an explosive ring that would not upset the geometry and very tight tolerances of the spinning disk with spin speeds of 5,200 and higher with a maximum spin speed of an HDD drive typically being 15,000 rpm. Any loss of geometry would cause read/write problems for the hard drive. These constraints make the claim impractical as a working solution.

One object of this invention is to provide an Apparatus which allows for the secure storage of data and means for ensuring its inoperability or destruction in circumstances where this would be desirable.

Accordingly there is provided an apparatus for storing data comprising a solid state data storage device (SSD) and a Printed Circuit Board (PCB) upon which the SSD is mounted, wherein the apparatus further comprises means for causing physical damage to the SSD located beneath the SSD in the event that at least one predetermined condition is met.

The applicant has found that an SSD is in one way amenable to the application of a highly energetic material (HEM) such as an explosive because unlike the disc platter of a disc drive it is stationary in relation to other components of an electronic apparatus and thus does not suffer from the potential problems outlined and noted above in relation to patent WO 02/095550. The applicant has further found however that SSDs are remarkably hardy and the mere application and detonation of an explosive proximate to the surface, particularly a 'free' surface of an SSD, does not necessarily result in sufficient damage to the SSD to prevent the recovery of data from it. Advantageously therefore an embodiment of the present invention, where HEM, which may be an explosive, is located in a hole underneath the SSD in a PCB upon which the SSD is mounted, generates a directed force upon activation of the HEM that results in the physical splitting of the SSD, which renders data stored upon it practically irrecoverable.

The further advantage of this embodiment, where there is a hole through the PCB, such that the hole is open at both ends prior to the application of the SSD and some HEM, is that this allows a manufacturing advantage in being able to add the HEM to the PCB after the SSD has been mounted upon it. Indeed, it is thereby possible to create a whole range of circuitry on the PCB and in doing so put it through a variety of manufacturing processes, some of which may involve heat or other elements such as liquids that could be deleterious to an HEM, before adding HEM as a subsequent step.

By way of further clarification, it is noted that nominally an SSD is located on a PCB in the manner of most electronic chips, ie: by means of 'feet' at the outer edges of the SSD which are soldered or otherwise connected to the PCB. In this way a significant impulse, such as from an explosive, from beneath the SSD directed roughly towards the centre of the SSD, or at least within the area of the main body away from the edges, will tend to result in a bending force upon the main body of the SSD, which can induce physical fractures or cracks in the device. Such an impulse could also be applied to the body of the SSD by physical means such as a pneumatic or hydraulic ram, or potentially by means of a solenoid. Whereas the application of HEM is in this case a preferred embodiment of the invention, it will be recognised that such physical means could be substituted for HEM in most of the embodiments herein otherwise described.

In this way, the invention provides a device that can be used to store data securely. In the event that the apparatus is compromised, the apparatus will physically damage the data storage device such that the information stored therein cannot readily be retrieved.

Typically the data storage device will comprise a Solid State Drive (SSD) such as a flash memory NAND based drive.

In a preferred embodiment, the data storage device is rendered largely inoperative by very small amounts of explosive material housed specifically within holes in the PCB underneath a solid state NAND data storage chip and other chip components that make up the apparatus. The ignition of the explosive material is provided via one of two on-board batteries passing a current through wires which are embedded within the explosive material. The holes in the PCB under the chips making up the data storage enable a directional force from the explosive material to pass up through the chips, causing them to fracture and thus damaging the silicone elements of the chips. All internal PCB tracks that make up the electrical device pass around the hole perimeters. The apparatus is configured to provide current from at least one of the batteries or from an external power source to ignite the explosive material and so damage the chips in the event that certain predetermined conditions are met. These predetermined conditions act as triggers to prompt the apparatus to ignite the explosive material.

In a further preferred embodiment, the apparatus is configured to activate the physical damaging means when the charge stored in at least one battery falls below a predetermined level. In this way, in the event that any power supply originating from an external source is interrupted, power from the battery can be used to activate the means. This ensures that an illegitimate user cannot simply wait for the apparatus to fail and then tamper with the data storage device, particularly when other anti-tamper mechanisms may be present. A further refinement is that the apparatus can be configured so that an authentication signal is required before the battery can be charged. In the event that charging of the battery is attempted without the authentication signal, power from the battery or power from an external source, even including the attempted charging means, can be used to activate the physical damaging means. This prevents an illegitimate user simply keeping the battery charged, hence keeping the stored data intact, whilst they attempt to circumvent any other anti-tamper mechanisms that may be present. The authentication signal may comprise any known means such as a code entered via a touch pad incorporated in the apparatus. Activation of the damaging means may occur if, for example, an incorrect code is entered a predetermined certain number of times.

Further predetermined conditions that may lead to activation of the damaging means may include, by way of example: the manual depressing of a button or other manual manipulation of some other manually manipulable device such as a key, switch, knob or touchpad; the removal or disruption of an interface connector internal or external to the device such as a cable, PCB connector such as a PCI bus interface, a SATA connector or USB connector, or any other similar data transfer interface known in the art; the receiving via GSM signal or service of an activation message; a change to a GSM signal or service, such as its unexpected cessation or unavailability for a certain predetermined period of time; the receipt of an emergency signal by way of radio transmission, Bluetooth or wireless; a failure to enter an appropriate code, password or phrase when prompted by the apparatus, which may be prompted for entry via a touchpad or keypad or by microphone; the generation of a signal resultant from motion of the apparatus measured by an accelerometer attached thereto.

Another useful embodiment of the invention is that the initiation of the activation of the damaging means in response to the pressing of a button may be in the circumstance that an apparatus has reached the end of its useful life. Currently much money is spent on disposal of data storage devices at the end of their working lives, wherein in order to preserve the confidentiality of data that has been stored on them, they are given to destruction specialists who ensure their destruction by, for example, physical means such as the passing of elements through a crusher or shredder. If an apparatus is provided with the damaging means of the invention as disclosed, then this becomes unnecessary; the apparatus can be configured such that a safety fracture plate or plastic tab can be removed, revealing a button, which when pressed initiates the damaging means. In this way data stored on SSDs within the apparatus is effectively rendered irrecoverable, and the apparatus may then be disposed of via standard procedure as opposed to by the use of more expensive confidentiality-preserving procedures.

Figure 2:
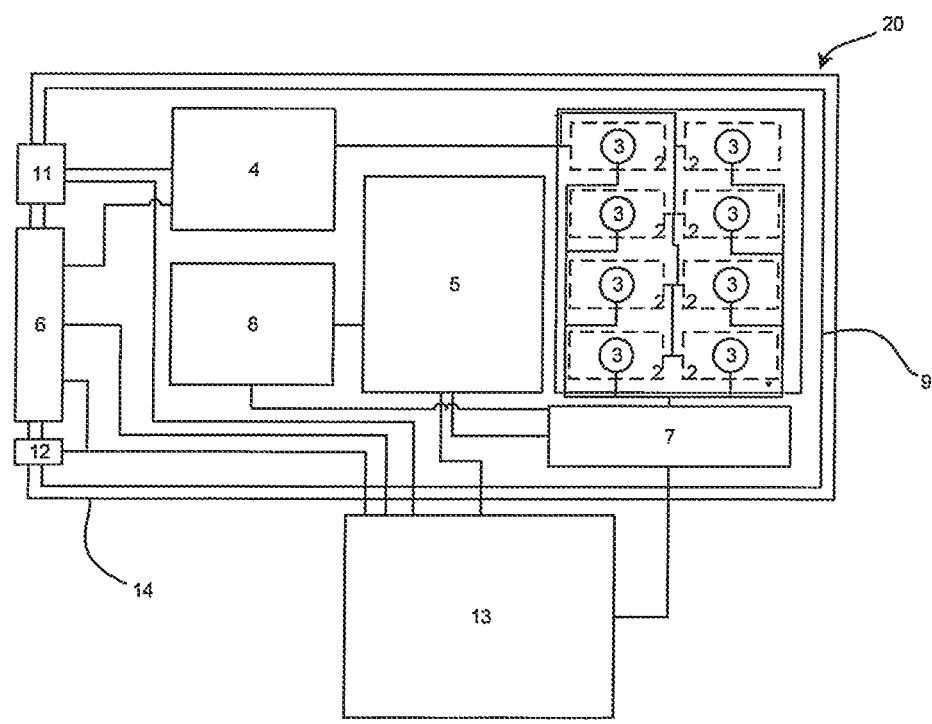

Certain embodiments of the invention will now be described, by way of example only, and with reference to the accompanying drawings in which FIGS. 1 and 2 are block diagrams showing plan views of a first and second embodiment of the invention respectively.

FIG. 1 is a block diagram showing a first data storage apparatus (10) designed for use inside a laptop computer or other computing device according to a first embodiment of the invention. The first data storage apparatus (10) comprises a PCB (9) upon which are mounted a SSD (Solid State Drive) controller (4), a battery (5), and a series of SSD (Solid State Drive) IC (Integrated Circuit) chips (2) for storing data, Holes (3) are positioned through the PCB (Printed Circuit Board) (9) under the SSD (2) IC (Integrated Circuit) chips to allow for a directional force to push up from under the SSD (2) IC chips resulting in the SSD (2) IC chips fracturing. The apparatus is also provided with a SATA (Serial Advanced Technology Attachment) connector (6) for transmitting and receiving data when in use, as well as supplying power to the SSD IC chips (2) where necessary. A second logic controller (7) manages the environmental and physical security triggers. A GSM (Global System for Mobile communication) module (8) provides external communications to the device and is controlled by the second logic controller (7).

The data storage apparatus (10) is designed to destroy the SSD IC chips (2) in the event that an alarm response is triggered in the logic controller (7). When the alarm response is triggered, a current is applied from the battery (5) to wires (not shown) with ends situated within the holes (3) in the PCB (9). This power supply is used to ignite explosive material such as lead styphnate located within the holes (3) within the PCB (9).

The logic controller (7) constantly monitors for the presence of a connector (1) connected to the data interface (6). When the connector (1) that connects the apparatus to a computing device via the data interface (6) is removed or sufficiently disturbed the logic controller (7) interprets this as an illegitimate attempt to access the data stored on the SSD IC chips (2) and will initiate the destruction process commanding a supply of power to the wires situated within the holes (3) in the PCB (9).

FIG. 2 is a block diagram of a second data storage apparatus (20) according to the invention. The second data storage apparatus (20) is designed to function as an external hard drive, being transported between different computers. The second data storage apparatus (20) comprises an SSD set of storage IC chips (2), and holes (3) through the PCB (9) under the SSD IC chips (2). It further comprises an SSD controller (4) and an additional logic controller (7). This embodiment further comprises a GSM module (8) which provides external communications to the device and is controlled by the second logic controller (7). The apparatus has an external eSATA interface (6) and an external USB interface (11). The apparatus has an auxiliary external power supply (12). Within the case (14) is a touch screen (13) which provides the signal to the apparatus to allow different functions to take place. One such function is the charging of the internal battery (5).

The invention claimed is:

1. An apparatus for storing data comprising an electronic chip and a Printed Circuit Board (PCB) upon which the electronic chip is mounted, wherein the apparatus further comprises means for causing physical damage to the electronic chip located beneath the electronic chip in the event that at least one predetermined condition is met, wherein the apparatus further comprises a hole through the PCB positioned under the electronic chip and the means for causing physical damage to the electronic chip is located within the hole, wherein the means for causing physical damage to the electronic chip is highly energetic material; and wherein the hole is open at both ends such that the highly energetic material can be added after the electronic chip has been mounted on the PCB.

2. The apparatus of claim 1, wherein the apparatus further comprises two wires embedded in the highly energetic material and configured such that a current can be applied to the highly energetic material via the wires to initiate the highly energetic material.

3. The apparatus of claim 1, wherein the apparatus further comprises at least one power supply and is configured to provide a current from at least one power supply to initiate the highly energetic material.

4. The apparatus of claim 3, wherein the at least one power supply is at least one battery.

5. The apparatus of claim 4, wherein one predetermined condition is that at least one battery reaches a specified level of charge.

6. The apparatus of claim 4, wherein the apparatus must be provided with an authentication signal before the at least one battery will accept a recharge.

7. The apparatus of claim 6, wherein one predetermined condition is an attempt to recharge the at least one battery without providing the authentication signal.

8. An apparatus for storing data comprising an electronic chip and a Printed Circuit Board (PCB) upon which the electronic chip is mounted, wherein the apparatus further comprises means for causing physical damage to the electronic chip in the event that at least one predetermined condition is met, wherein one predetermined condition is that the apparatus is deprived of a GSM (Global System for Mobile communication) signal and/or GSM service for a defined period of time; and wherein the apparatus further comprises a hole through the PCB positioned under the electronic chip and the means for causing physical damage to the electronic chip is located within the hole, wherein the means for causing physical damage to the electronic chip is highly energetic material, wherein the hole is open at both ends such that the highly energetic material can be added after the electronic chip has been mounted on the PCB.

9. The apparatus of claim 1, wherein the apparatus further comprises a data connection interface and one predetermined condition is that this interface is disturbed.

10. The apparatus of claim 9, wherein the disturbance comprises the unexpected removal or addition of a connector to or within the apparatus.

11. The apparatus of claim 1, wherein the apparatus further comprises an external manually manipulable element either integral or remotely attached to the apparatus and one predetermined condition is that the manually manipulable element is manually manipulated.

12. The apparatus of claim 11, wherein the manually manipulable element is a button.

13. The apparatus of claim 1, wherein the apparatus is portable.

14. The apparatus of claim 1, wherein the apparatus comprises a solid state data storage device (SSD) comprising the electronic chip.

15. The apparatus of claim 1, wherein the apparatus is configured to generate a force directed towards the centre of the electronic chip upon activation of the highly energetic material.

16. The apparatus of claim 1, wherein the apparatus further comprises: a plurality of electronic chips mounted upon the PCB; a plurality of holes through the PCB, wherein each of the plurality of holes is positioned under a different one of the plurality of electronic chips; and highly energetic material located within each of the plurality of holes.

* * * * *